(12) United States Patent
Johnson

(10) Patent No.: US 8,808,540 B2
(45) Date of Patent: Aug. 19, 2014

(54) MODULE CLEANING METHOD

(75) Inventor: Warren Thomas Johnson, New South Wales (AU)

(73) Assignee: Evoqua Water Technologies LLC, Alpharetta, GA (US)

(*) Notice: Subject to any disclaimer, the term of this patent is extended or adjusted under 35 U.S.C. 154(b) by 77 days.

(21) Appl. No.: 10/595,841

(22) PCT Filed: Nov. 12, 2004

(86) PCT No.: PCT/AU2004/001567
§ 371 (c)(1),
(2), (4) Date: May 15, 2006

(87) PCT Pub. No.: WO2005/046849
PCT Pub. Date: May 26, 2005

(65) Prior Publication Data
US 2007/0075021 A1 Apr. 5, 2007

(30) Foreign Application Priority Data

Nov. 14, 2003 (AU) ................................ 2003906297

(51) Int. Cl.
*B01D 65/02* (2006.01)
(52) U.S. Cl.
USPC .................... 210/321.69; 210/409; 210/321.8; 210/321.89; 134/166 R
(58) Field of Classification Search
USPC ......... 210/321.69, 321.8, 321.89, 636, 321.6, 210/106, 167.09, 167.14, 355, 391, 393, 210/409, 760, 333.01, 333.1, 233.1; 134/166 R, 101.1, 102.1–102.3; 15/1.7, 15/104.04
See application file for complete search history.

(56) References Cited

U.S. PATENT DOCUMENTS 256,008 A 4/1882 Leak
285,321 A 9/1883 Tams
(Continued)

FOREIGN PATENT DOCUMENTS

AU 34400/84 A 4/1985
AU 55847/86 A 9/1986
(Continued)

OTHER PUBLICATIONS

Examination Report for corresponding New Zealand Application No. 546959, dated Oct. 27, 2006, pp. 1-3.
(Continued)

*Primary Examiner* — Matthew O Savage
*Assistant Examiner* — Benjamin J Behrendt

(57) ABSTRACT

An aeration/backwash device (16) for use with a porous membrane filtration module (5) including one or more membranes (6) extending longitudinally between vertically spaced upper (7) and lower headers (8) into which the ends of the membranes are potted. The membranes (6) having a permeable wall which, in use, is subjected to a filtration operation wherein feed containing contaminant matter is applied to one side of the membrane wall and filtrate is withdrawn from the other side of the membrane wall. The aeration/backwash device (16) adapted to at least partially surround a portion of said membrane module (5) and including a communication chamber (17) having spaced through-openings (18, 19) in fluid communication with the chamber (17) and the membrane module (5). In use, gas is supplied to the chamber (17) and communicated to the membrane module (5) through the through-openings (18, 19) to aerate the membranes within the membrane module and liquid backwash is withdrawn from and/or fed into the membrane module (5) through the throughopenings into the chamber (17).

33 Claims, 5 Drawing Sheets

(56) References Cited

U.S. PATENT DOCUMENTS

| | | |
|---|---|---|
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A * | 9/1985 | Young .............................. 122/32 |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |

(56) References Cited

U.S. PATENT DOCUMENTS

| | | | |
|---|---|---|---|
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A * | 4/1993 | Gentry et al. ................ 165/160 |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A * | 3/1997 | Cote et al. ................ 210/650 |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |

(56) References Cited

U.S. PATENT DOCUMENTS

| | | | |
|---|---|---|---|
| 5,958,243 | A | 9/1999 | Lawrence et al. |
| 5,961,830 | A | 10/1999 | Barnett |
| 5,968,357 | A | 10/1999 | Doelle et al. |
| 5,988,400 | A | 11/1999 | Karachevtcev et al. |
| 5,989,428 | A | 11/1999 | Goronszy |
| 5,997,745 | A | 12/1999 | Tonelli et al. |
| 6,001,254 | A | 12/1999 | Espenan et al. |
| 6,007,712 | A | 12/1999 | Tanaka et al. |
| 6,017,451 | A | 1/2000 | Kopf |
| 6,024,872 | A | 2/2000 | Mahendran et al. |
| 6,036,030 | A | 3/2000 | Stone et al. |
| 6,039,872 | A | 3/2000 | Wu et al. |
| 6,042,677 | A | 3/2000 | Mahendran et al. |
| 6,045,698 | A | 4/2000 | Cote et al. |
| 6,045,899 | A | 4/2000 | Wang et al. |
| 6,048,454 | A | 4/2000 | Jenkins |
| 6,048,455 | A | 4/2000 | Janik |
| 6,066,401 | A | 5/2000 | Stilburn |
| 6,071,404 | A * | 6/2000 | Tsui ............................ 210/232 |
| 6,074,718 | A | 6/2000 | Puglia et al. |
| 6,077,435 | A | 6/2000 | Beck et al. |
| 6,083,393 | A | 7/2000 | Wu et al. |
| 6,096,213 | A | 8/2000 | Radovanovic et al. |
| 6,113,782 | A | 9/2000 | Leonard |
| 6,120,688 | A | 9/2000 | Daly et al. |
| 6,126,819 | A | 10/2000 | Heine et al. |
| 6,146,747 | A | 11/2000 | Wang et al. |
| 6,149,817 | A | 11/2000 | Peterson et al. |
| 6,156,200 | A | 12/2000 | Zha et al. |
| 6,159,373 | A | 12/2000 | Beck et al. |
| 6,162,020 | A | 12/2000 | Kondo |
| 6,193,890 | B1 | 2/2001 | Pedersen et al. |
| 6,202,475 | B1 | 3/2001 | Selbie et al. |
| 6,214,231 | B1 | 4/2001 | Cote et al. |
| 6,214,232 | B1 | 4/2001 | Baurmeister et al. |
| 6,221,247 | B1 | 4/2001 | Nemser et al. |
| 6,245,239 | B1 | 6/2001 | Cote et al. |
| 6,254,773 | B1 | 7/2001 | Biltoft |
| 6,264,839 | B1 | 7/2001 | Mohr et al. |
| 6,277,512 | B1 | 8/2001 | Hamrock et al. |
| 6,280,626 | B1 | 8/2001 | Miyashita et al. |
| 6,284,135 | B1 | 9/2001 | Ookata |
| 6,290,756 | B1 | 9/2001 | Macheras et al. |
| 6,294,039 | B1 | 9/2001 | Mahendran et al. |
| 6,299,773 | B1 | 10/2001 | Takamura et al. |
| 6,303,026 | B1 | 10/2001 | Lindbo |
| 6,303,035 | B1 | 10/2001 | Cote et al. |
| 6,315,895 | B1 | 11/2001 | Summerton et al. |
| 6,319,411 | B1 | 11/2001 | Cote |
| 6,322,703 | B1 | 11/2001 | Taniguchi et al. |
| 6,324,898 | B1 | 12/2001 | Cote et al. |
| 6,325,928 | B1 | 12/2001 | Pedersen et al. |
| 6,325,938 | B1 | 12/2001 | Miyashita et al. |
| 6,331,248 | B1 | 12/2001 | Taniguchi et al. |
| 6,337,018 | B1 | 1/2002 | Mickols |
| RE37,549 | E | 2/2002 | Mahendran et al. |
| 6,349,835 | B1 | 2/2002 | Saux et al. |
| 6,354,444 | B1 | 3/2002 | Mahendran et al. |
| 6,361,695 | B1 | 3/2002 | Husain et al. |
| 6,368,819 | B1 | 4/2002 | Gaddy et al. |
| 6,372,138 | B1 | 4/2002 | Cho et al. |
| 6,375,848 | B1 | 4/2002 | Cote et al. |
| 6,383,369 | B2 | 5/2002 | Elston |
| 6,387,189 | B1 | 5/2002 | Groschl et al. |
| 6,402,955 | B2 | 6/2002 | Ookata |
| 6,406,629 | B1 | 6/2002 | Husain et al. |
| 6,423,214 | B1 | 7/2002 | Lindbo |
| 6,423,784 | B1 | 7/2002 | Hamrock et al. |
| 6,432,310 | B1 | 8/2002 | Andou et al. |
| 6,440,303 | B2 | 8/2002 | Spriegel |
| D462,699 | S | 9/2002 | Johnson et al. |
| 6,444,124 | B1 | 9/2002 | Onyeche et al. |
| 6,468,430 | B1 | 10/2002 | Kimura et al. |
| 6,471,869 | B1 | 10/2002 | Yanou et al. |
| 6,485,645 | B1 | 11/2002 | Husain et al. |
| 6,495,041 | B2 | 12/2002 | Taniguchi et al. |
| 6,517,723 | B1 | 2/2003 | Daigger et al. |
| 6,524,481 | B2 | 2/2003 | Zha et al. |
| 6,524,733 | B1 | 2/2003 | Nonobe |
| 6,550,747 | B2 | 4/2003 | Rabie et al. |
| 6,555,005 | B1 | 4/2003 | Zha et al. |
| 6,562,237 | B1 | 5/2003 | Olaopa |
| 6,576,136 | B1 | 6/2003 | De Moel et al. |
| 6,592,762 | B2 | 7/2003 | Smith |
| D478,913 | S | 8/2003 | Johnson et al. |
| 6,613,222 | B2 | 9/2003 | Mikkelson et al. |
| 6,620,319 | B2 | 9/2003 | Behmann et al. |
| 6,623,643 | B2 | 9/2003 | Chisholm et al. |
| 6,627,082 | B2 | 9/2003 | Del Vecchio et al. |
| 6,632,358 | B1 | 10/2003 | Suga et al. |
| 6,635,179 | B1 | 10/2003 | Summerton et al. |
| 6,641,733 | B2 | 11/2003 | Zha et al. |
| 6,645,374 | B2 | 11/2003 | Cote et al. |
| 6,656,356 | B2 | 12/2003 | Gungerich et al. |
| 6,682,652 | B2 | 1/2004 | Mahendran et al. |
| 6,685,832 | B2 | 2/2004 | Mahendran et al. |
| 6,696,465 | B2 | 2/2004 | Dellaria et al. |
| 6,702,561 | B2 | 3/2004 | Stillig et al. |
| 6,706,185 | B2 | 3/2004 | Goel et al. |
| 6,706,189 | B2 | 3/2004 | Rabie et al. |
| 6,708,957 | B2 | 3/2004 | Cote et al. |
| 6,712,970 | B1 | 3/2004 | Trivedi |
| 6,721,529 | B2 | 4/2004 | Chen et al. |
| 6,723,242 | B1 | 4/2004 | Ohkata et al. |
| 6,723,758 | B2 | 4/2004 | Stone et al. |
| 6,727,305 | B1 | 4/2004 | Pavez Aranguiz |
| 6,743,362 | B1 | 6/2004 | Porteous et al. |
| 6,755,970 | B1 | 6/2004 | Knappe et al. |
| 6,758,972 | B2 | 7/2004 | Vriens et al. |
| 6,761,826 | B2 | 7/2004 | Bender |
| 6,770,202 | B1 | 8/2004 | Kidd et al. |
| 6,780,466 | B2 | 8/2004 | Grangeon et al. |
| 6,783,008 | B2 | 8/2004 | Zha et al. |
| 6,790,347 | B2 | 9/2004 | Jeong et al. |
| 6,790,912 | B2 | 9/2004 | Blong |
| 6,805,806 | B2 | 10/2004 | Arnaud |
| 6,808,629 | B2 | 10/2004 | Wouters-Wasiak et al. |
| 6,811,696 | B2 | 11/2004 | Wang et al. |
| 6,814,861 | B2 | 11/2004 | Husain et al. |
| 6,821,420 | B2 | 11/2004 | Zha et al. |
| 6,830,782 | B2 | 12/2004 | Kanazawa |
| 6,840,251 | B2 | 1/2005 | Gill et al. |
| 6,841,070 | B2 | 1/2005 | Zha et al. |
| 6,861,466 | B2 | 3/2005 | Dadalas et al. |
| 6,863,816 | B2 | 3/2005 | Austin et al. |
| 6,863,817 | B2 | 3/2005 | Liu et al. |
| 6,863,818 | B2 | 3/2005 | Daigger et al. |
| 6,863,823 | B2 | 3/2005 | Cote |
| 6,869,534 | B2 | 3/2005 | McDowell et al. |
| 6,872,305 | B2 | 3/2005 | Johnson et al. |
| 6,881,343 | B2 | 4/2005 | Rabie et al. |
| 6,884,350 | B2 | 4/2005 | Muller |
| 6,884,375 | B2 | 4/2005 | Wang et al. |
| 6,890,435 | B2 | 5/2005 | Ji et al. |
| 6,890,645 | B2 | 5/2005 | Disse et al. |
| 6,893,568 | B1 | 5/2005 | Janson et al. |
| 6,899,812 | B2 | 5/2005 | Cote et al. |
| 6,936,085 | B2 | 8/2005 | DeMarco |
| 6,946,073 | B2 | 9/2005 | Daigger et al. |
| 6,952,258 | B2 | 10/2005 | Ebert et al. |
| 6,955,762 | B2 | 10/2005 | Gallagher et al. |
| 6,962,258 | B2 | 11/2005 | Zha et al. |
| 6,964,741 | B2 | 11/2005 | Mahendran et al. |
| 6,969,465 | B2 | 11/2005 | Zha et al. |
| 6,974,554 | B2 | 12/2005 | Cox et al. |
| 6,994,867 | B1 | 2/2006 | Hossainy et al. |
| 7,005,100 | B2 | 2/2006 | Lowell |
| 7,014,763 | B2 | 3/2006 | Johnson et al. |
| 7,018,530 | B2 | 3/2006 | Pollock |
| 7,018,533 | B2 | 3/2006 | Johnson et al. |
| 7,022,233 | B2 | 4/2006 | Chen |
| 7,041,728 | B2 | 5/2006 | Zipplies et al. |
| 7,052,610 | B2 | 5/2006 | Janson et al. |
| 7,083,733 | B2 | 8/2006 | Freydina et al. |

(56) References Cited

U.S. PATENT DOCUMENTS

| | | |
|---|---|---|
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1* | 6/2002 | Yamada ................ 210/321.8 |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1* | 4/2003 | Merrie et al. ............. 210/454 |
| 2003/0075495 A1* | 4/2003 | Dannstrom et al. ...... 210/321.88 |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1* | 3/2004 | Watanabe et al. ........ 210/321.79 |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1* | 11/2004 | Zha et al. .................. 210/636 |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |

(56) References Cited

U.S. PATENT DOCUMENTS

| | | |
|---|---|---|
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | | |
|---|---|---|---|
| AU | 77066/87 A | 2/1988 | |
| AU | 762091 B2 | 6/2003 | |
| AU | 2004289373 A1 | 5/2005 | |
| CA | 2460207 A1 | 3/2003 | |
| CA | 2531764 A1 | 3/2005 | |
| CN | 86104888 A | 2/1988 | |
| CN | 1050770 | 1/1995 | |
| CN | 2204898Y Y | 8/1995 | |
| CN | 2236049Y Y | 9/1996 | |
| CN | 1159769 A | 9/1997 | |
| CN | 1244814 A | 2/2000 | |
| CN | 1249698 A | 4/2000 | |
| CN | 1265636 A | 9/2000 | |
| CN | 1319032 A | 10/2001 | |
| CN | 1468140 A | 1/2004 | |
| CN | 1541757 A | 11/2004 | |
| DE | 3904544 A1 | 8/1990 | |
| DE | 4117281 A1 | 1/1992 | |
| DE | 4113420 A1 | 10/1992 | |
| DE | 4117422 C1 | 11/1992 | |
| DE | 4326603 A1 | 2/1995 | |
| DE | 19503060 A1 | 8/1996 | |
| DE | 29804927 U1 | 6/1998 | |
| DE | 29906389 U1 | 6/1999 | |
| DE | 10045227 C1 | 2/2002 | |
| DE | 10209170 C1 | 8/2003 | |
| DE | 202004012693 U1 | 10/2004 | |
| EP | 012557 B1 | 2/1983 | |
| EP | 126714 A2 | 11/1984 | |
| EP | 050447 B1 | 10/1985 | |
| EP | 194735 A2 | 9/1986 | |
| EP | 250337 A1 | 12/1987 | |
| EP | 327025 A1 | 8/1989 | |
| EP | 344633 A1 | 12/1989 | |
| EP | 090383 B1 | 5/1990 | |
| EP | 407900 A2 | 1/1991 | |
| EP | 463627 A2 | 1/1992 | |
| EP | 0464321 A1 | 1/1992 | |
| EP | 492942 A2 | 7/1992 | |
| EP | 518250 B1 | 12/1992 | |
| EP | 547575 A1 | 6/1993 | |
| EP | 280052 B1 | 7/1994 | |
| EP | 395133 B1 | 2/1995 | |
| EP | 662341 A1 | 7/1995 | |
| EP | 492446 B1 | 11/1995 | |
| EP | 430082 B1 | 6/1996 | |
| EP | 734758 A1 | 10/1996 | |
| EP | 763758 A1 | 3/1997 | |
| EP | 824956 A2 | 2/1998 | |
| EP | 848194 A2 | 6/1998 | |
| EP | 855214 A1 | 7/1998 | |
| EP | 627255 B1 | 1/1999 | |
| EP | 911073 A1 | 4/1999 | |
| EP | 920904 A2 | 6/1999 | |
| EP | 0937494 A2 | 8/1999 | |
| EP | 1034835 A1 | 9/2000 | |
| EP | 1052012 A1 | 11/2000 | |
| EP | 1156015 A1 | 11/2001 | |
| EP | 1300186 A1 | 4/2003 | |
| EP | 1349644 B1 | 10/2003 | |
| EP | 1350555 A1 | 10/2003 | |
| EP | 1236503 B1 | 8/2004 | |
| EP | 1445240 | 8/2004 | |
| EP | 1466658 A1 | 10/2004 | |
| EP | 1659171 A1 | 5/2006 | |
| EP | 1420874 B1 | 1/2011 | |
| FR | 2620712 A1 | 3/1989 | |
| FR | 2674448 A1 | 10/1992 | |
| FR | 2699424 A1 | 6/1994 | |
| FR | 2762834 A1 | 11/1998 | |
| GB | 702911 A | 1/1954 | |
| GB | 996195 A | 6/1965 | |
| GB | 2253572 A | 9/1992 | |
| JP | 52-078677 A | 7/1977 | |
| JP | 53-5077 | 1/1978 | |
| JP | 53108882 A | 9/1978 | |
| JP | 54162684 A | 12/1979 | |
| JP | 55099703 A | 7/1980 | |
| JP | 55129107 A | 10/1980 | |
| JP | 55129155 A | 10/1980 | |
| JP | 56021604 A | 2/1981 | |
| JP | 56118701 A | 9/1981 | |
| JP | 56121685 A | 9/1981 | |
| JP | 57190697 A | 11/1982 | |
| JP | 58088007 A | 5/1983 | |
| JP | 60019002 A | 1/1985 | |
| JP | 60-206412 A | 10/1985 | |
| JP | 60260628 A | 12/1985 | |
| JP | 61097005 A | 5/1986 | |
| JP | 61097006 A | 5/1986 | |
| JP | 61107905 A | 5/1986 | |
| JP | 61167406 A | 7/1986 | |
| JP | 61167407 A | 7/1986 | |
| JP | 61171504 A | 8/1986 | |
| JP | 61192309 A | 8/1986 | |
| JP | 61222510 A | 10/1986 | |
| JP | 61242607 A | 10/1986 | |
| JP | 61249505 A | 11/1986 | |
| JP | 61257203 A | 11/1986 | |
| JP | 61263605 A | 11/1986 | |
| JP | 61291007 A | 12/1986 | |
| JP | 61293504 A | 12/1986 | |
| JP | 62004408 A | 1/1987 | |
| JP | 62068828 A | 3/1987 | |
| JP | 62114609 A | 5/1987 | |
| JP | 62140607 A | 6/1987 | |
| JP | 62144708 A | 6/1987 | |
| JP | 62163708 A | 7/1987 | |
| JP | 62179540 A | 8/1987 | |
| JP | 62 250908 A | 10/1987 | ............ B01D 13/01 |
| JP | 62237908 A | 10/1987 | |
| JP | 62187606 | 11/1987 | |
| JP | 62262710 A | 11/1987 | |
| JP | 63-93307 | 4/1988 | |
| JP | 63097634 A | 4/1988 | |
| JP | 63099246 A | 4/1988 | |

(56) References Cited

FOREIGN PATENT DOCUMENTS

| | | |
|---|---|---|
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07-204635 A | 8/1995 |
| JP | 07236819 A | 9/1995 |
| JP | 07-256253 | 10/1995 |
| JP | 07251043 A | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08-197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09-075689 A | 3/1997 |
| JP | 09072993 A | 3/1997 |
| JP | 09099227 A | 4/1997 |
| JP | 09103655 A | 4/1997 |
| JP | 9103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09-313902 A | 12/1997 |
| JP | 09324067 A | 12/1997 |
| JP | 10-015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10-085566 A | 4/1998 |
| JP | 10085562 A | 4/1998 |
| JP | 10085565 A | 4/1998 |
| JP | 10156149 A | 6/1998 |
| JP | 10180048 A | 7/1998 |
| JP | 10225685 A | 8/1998 |
| JP | 10-249171 A | 9/1998 |
| JP | 10235168 A | 9/1998 |
| JP | 10286441 A | 10/1998 |
| JP | 10328538 A | 12/1998 |
| JP | 11005023 A | 1/1999 |
| JP | 11-031025 A | 2/1999 |
| JP | 11 033367 A | 2/1999 ............ B01D 63/02 |
| JP | 11028339 A | 2/1999 |
| JP | 11028467 A | 2/1999 |
| JP | 11033365 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11-179171 A | 7/1999 |
| JP | 11-309351 A | 11/1999 |
| JP | 11300177 A | 11/1999 |
| JP | 11302438 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 2000-51670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000-093758 | 4/2000 |
| JP | 2000-157845 | 6/2000 |
| JP | 2000157850 A | 6/2000 |
| JP | 2000185220 A | 7/2000 |
| JP | 2000189958 A | 7/2000 |

(56) References Cited

FOREIGN PATENT DOCUMENTS

| | | | | |
|---|---|---|---|---|
| JP | 2000233020 A | 8/2000 | | |
| JP | 2000237548 A | 9/2000 | | |
| JP | 2000300968 A | 10/2000 | | |
| JP | 2000317276 A | 11/2000 | | |
| JP | 2000-334276 A | 12/2000 | | |
| JP | 2000342932 A | 12/2000 | | |
| JP | 2001009246 A | 1/2001 | | |
| JP | 2001070967 A | 3/2001 | | |
| JP | 2001079366 A | 3/2001 | | |
| JP | 2001079367 A | 3/2001 | | |
| JP | 2001104760 A | 4/2001 | | |
| JP | 2001120963 A | 5/2001 | | |
| JP | 2001-510396 T | 7/2001 | | |
| JP | 2001179059 A | 7/2001 | | |
| JP | 2001179060 A | 7/2001 | | |
| JP | 2001190937 A | 7/2001 | | |
| JP | 2001190938 A | 7/2001 | | |
| JP | 2001205055 A | 7/2001 | | |
| JP | 2001212587 A | 8/2001 | | |
| JP | 2001232160 A | 8/2001 | | |
| JP | 2001-269546 | 10/2001 | | |
| JP | 2002011472 A | 1/2002 | | |
| JP | 2002143849 A | 5/2002 | | |
| JP | 2002177746 A | 6/2002 | | |
| JP | 3302992 B2 | 7/2002 | | |
| JP | 2002-527229 A | 8/2002 | | |
| JP | 2002525197 T | 8/2002 | | |
| JP | 2002263407 A | 9/2002 | | |
| JP | 2002-336663 | 11/2002 | | |
| JP | 2003024751 | 1/2003 | | |
| JP | 2003047830 * | 2/2003 | ............. | B01D 65/02 |
| JP | 2003053157 A | 2/2003 | | |
| JP | 2003053160 A | 2/2003 | | |
| JP | 200371254 A | 3/2003 | | |
| JP | 2003062436 A | 3/2003 | | |
| JP | 2003135935 A | 5/2003 | | |
| JP | 2003190976 A | 7/2003 | | |
| JP | 2003-265597 | 9/2003 | | |
| JP | 2003-275548 A | 9/2003 | | |
| JP | 2003266072 A | 9/2003 | | |
| JP | 2003275759 A | 9/2003 | | |
| JP | 2003340250 A | 12/2003 | | |
| JP | 2004-008981 | 1/2004 | | |
| JP | 2004073950 A | 3/2004 | | |
| JP | 2004-230287 A | 8/2004 | | |
| JP | 2004216263 A | 8/2004 | | |
| JP | 2004230280 A | 8/2004 | | |
| JP | 2004249168 A | 9/2004 | | |
| JP | 2004322100 A | 11/2004 | | |
| JP | 2004-536710 A | 12/2004 | | |
| JP | 2004337730 A | 12/2004 | | |
| JP | 2005-502467 A | 1/2005 | | |
| JP | 2005-087887 A | 4/2005 | | |
| JP | 2005144291 A | 6/2005 | | |
| JP | 2005154551 A | 6/2005 | | |
| JP | 2005279447 A | 10/2005 | | |
| JP | 2006-116495 | 5/2006 | | |
| JP | 2007-547083 | 8/2010 | | |
| JP | 4833353 B2 | 12/2011 | | |
| KR | 20-0232145 | 7/2001 | | |
| KR | 1020020067227 | 8/2002 | | |
| KR | 20-0295350 | 11/2002 | | |
| KR | 2002-0090967 | 12/2002 | | |
| KR | 2003-033812 | 5/2003 | | |
| KR | 2003-060625 | 7/2003 | | |
| KR | 2005-063478 | 6/2005 | | |
| NL | 1006390 C2 | 12/1998 | | |
| NL | 1020491 C | 10/2003 | | |
| NL | 1021197 C | 10/2003 | | |
| NO | 20053769 A | 2/2006 | | |
| NZ | 510394 A | 5/2003 | | |
| NZ | 537874 A | 2/2007 | | |
| TW | 347343 | 12/1998 | | |
| WO | 8501449 A1 | 4/1985 | | |
| WO | 8605116 A1 | 9/1986 | | |
| WO | 8605705 A1 | 10/1986 | | |
| WO | 8800494 A1 | 1/1988 | | |
| WO | 8801529 A1 | 3/1988 | | |
| WO | 88001895 A1 | 3/1988 | | |
| WO | 8806200 A1 | 8/1988 | | |
| WO | 8900880 A1 | 2/1989 | | |
| WO | 9000434 A1 | 1/1990 | | |
| WO | 9104783 A1 | 4/1991 | | |
| WO | 9116124 A1 | 10/1991 | | |
| WO | 9302779 A1 | 2/1993 | | |
| WO | 9315827 A1 | 8/1993 | | |
| WO | 9323152 A1 | 11/1993 | | |
| WO | 9411094 A1 | 5/1994 | | |
| WO | 9511736 A1 | 5/1995 | | |
| WO | 9534424 A1 | 12/1995 | | |
| WO | 9603202 A1 | 2/1996 | | |
| WO | 9607470 A1 | 3/1996 | | |
| WO | 9628236 A1 | 9/1996 | | |
| WO | 9629142 A1 | 9/1996 | | |
| WO | 9641676 A1 | 12/1996 | | |
| WO | 9706880 A2 | 2/1997 | | |
| WO | 9822204 A1 | 5/1998 | | |
| WO | 9825694 A1 | 6/1998 | | |
| WO | WO98/28066 | 7/1998 | | |
| WO | 9853902 A1 | 12/1998 | | |
| WO | 9901207 A1 | 1/1999 | | |
| WO | 99-55448 A1 | 11/1999 | | |
| WO | 9959707 A1 | 11/1999 | | |
| WO | WO00/18498 | 4/2000 | | |
| WO | 0030742 A1 | 6/2000 | | |
| WO | 0100307 A2 | 1/2001 | | |
| WO | 0105715 A1 | 1/2001 | | |
| WO | 0108790 A1 | 2/2001 | | |
| WO | 0119414 A1 | 3/2001 | | |
| WO | 0132299 A1 | 5/2001 | | |
| WO | 0136075 A1 | 5/2001 | | |
| WO | 0143856 A1 | 6/2001 | | |
| WO | 0145829 A1 | 6/2001 | | |
| WO | 0226363 A2 | 4/2002 | | |
| WO | 0230550 A1 | 4/2002 | | |
| WO | 0240140 A1 | 5/2002 | | |
| WO | 0247800 A1 | 6/2002 | | |
| WO | 03000389 A2 | 1/2003 | | |
| WO | 03013706 A1 | 2/2003 | | |
| WO | WO03/013706 | 2/2003 | | |
| WO | WO 03/024575 | 3/2003 | ............. | B01D 65/02 |
| WO | 03053552 A1 | 7/2003 | | |
| WO | 03057632 A1 | 7/2003 | | |
| WO | 03059495 A1 | 7/2003 | | |
| WO | 03068374 A1 | 8/2003 | | |
| WO | 03095078 A1 | 11/2003 | | |
| WO | 2004024304 A2 | 3/2004 | | |
| WO | WO2004018084 | 3/2004 | ............. | B01D 65/02 |
| WO | WO2004033078 | 4/2004 | ............. | B01D 65/02 |
| WO | 2004050221 A1 | 6/2004 | | |
| WO | 2004056458 A3 | 7/2004 | | |
| WO | 2004078327 A1 | 9/2004 | | |
| WO | 2004101120 A1 | 11/2004 | | |
| WO | 2005005028 A1 | 1/2005 | | |
| WO | 2005021140 A1 | 3/2005 | | |
| WO | 2005028085 A1 | 3/2005 | | |
| WO | 2005028086 A1 | 3/2005 | | |
| WO | 2005037414 A1 | 4/2005 | | |
| WO | 2005046849 A1 | 5/2005 | | |
| WO | 2005077499 A1 | 8/2005 | | |
| WO | 2005082498 A1 | 9/2005 | | |
| WO | 2005107929 A2 | 11/2005 | | |
| WO | 2006026814 A1 | 3/2006 | | |
| WO | 2006029456 A1 | 3/2006 | | |
| WO | 2006029465 | 3/2006 | | |
| WO | 2006047814 A1 | 5/2006 | | |
| WO | 2006066350 A1 | 6/2006 | | |
| WO | 2007053528 A2 | 5/2007 | | |
| WO | 2007065956 A1 | 6/2007 | | |
| WO | 2007135087 A1 | 11/2007 | | |
| WO | 2008025077 A1 | 3/2008 | | |
| WO | 2008034570 A1 | 3/2008 | | |
| WO | 2008071516 A1 | 6/2008 | | |

(56) References Cited

FOREIGN PATENT DOCUMENTS

| WO | 2008141080 A1 | 11/2008 |
|---|---|---|
| WO | 2008153818 A1 | 12/2008 |
| WO | 2009030405 A1 | 3/2009 |

OTHER PUBLICATIONS

Supplementary European Search Report dated Aug. 21, 2008 for Application No. PCT/AU2004/001567.
European Examination Report dated Apr. 13, 2011 for Application No. 04797016.5.
Coulson et al., "Coulson and Richardson's Chemical Engineering," 1999, vol. 1, pp. 358-364.
"Chemical Cleaning Definition", Lenntech BV, Lenntech Water treatment & purification Holding B.V., Chemical Cleaning.
Almulla et al., Desalination, 153 (2002), pp. 237-243.
Anonymous, "Nonwoven Constructions of Dyneon "THV and Dyneon " The Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The Zenon experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007 filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwm-mrw.interscience.wiley.com/eow/.
Webster's Ninth New Collegiate Dictionary, Merriam-Webster Inc., Publishers, Springfield, Massachusetts, USA, Copyright 1986, p. 1298.
White et al., The Chemical Engineering Journal, 52 (1993), pp. 73-77.
Wikipedia, "Seawater," available at http://en.wikipedia.org/wiki/Seawater, Jul. 15, 2007.
Yamamoto et al., Water Science Technology, vol. 2, pp. 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-99," Mar. 2000, entire publication.
Canadian Office Action dated Apr. 29, 2011 for Application No. 2,544,626.
Canadian Office Action dated Mar. 14, 2012 for Application No. 2,544,626.
Cui et al., "Airlift crossflow membrane filtration—a feasibility study with dextran ultrafiltration," J. Membrane Sci. (1997) vol. 128, pp. 83-91.
Japanese Office Action dated Nov. 8, 2011 for Application No. 2006-538603 (with translation).
Korean Office Action dated Nov. 30, 2011 for Application No. 10-2006-7011474 (with translation).
Malaysian Examination Report dated Nov. 30, 2011 for Application No. PI 20061855 (with translation).
Indian First Examination Report dated Nov. 27, 2012 for Application No. 2581/DELNP/2006.

\* cited by examiner

MODULE CLEANING METHOD

CROSS REFERENCE TO RELATED APPLICATIONS AND PRIORITY CLAIM

This application is a U.S. national stage application and claims the benefit under 35 U.S.C. §371 of International Application No. PCT/AU2004/001567 filed on Nov. 12, 2004, entitled IMPROVED MODULE CLEANING METHOD, which is based on Australian Patent Application No. 2003906297 filed on Nov. 14, 2003, entitled IMPROVED MODULE CLEANING METHOD, each of which is entirely incorporated herein by reference for all purposes, and to which this application claims the benefit of priority.

FIELD OF THE INVENTION

The present invention relates to membrane filtration systems, and more particularly to those systems employing porous or permeable membranes located in pressurised shell or, a tank or cell open to atmosphere and a backwash device therefor.

BACKGROUND ART

Any discussion of the prior art throughout the specification should in no way be considered as an admission that such prior art is widely known or forms part of common general knowledge in the field.

Porous membrane filtration systems require regular backwashing of the membranes to maintain filtration efficiency and flux while reducing transmembrane pressure (TMP) which rises as the membrane pores become clogged with impurities. Typically, during the backwash cycle the impurities are forced out of the membrane pores and/or scoured from the membrane surfaces into the feed tank or cell by one or more of pressurised gas, gas bubbles, liquid or a mixture thereof. The liquid containing impurities and deposits from the membranes is then drained or flushed from the tank.

Further, in filtration systems employing gas bubble scouring of the membranes it has been found advantageous to confine the bubbles as much as possible in the region of the membranes to assist with the scouring process.

Minimising the footprint of filtration systems is also desirable in terms of space eventually occupied by the filtration plant. Compact systems have lower cost, less waste volume, lesser impact on the environment and are more acceptable to the market.

It would be desirable to be able to provide the advantages of such systems to known systems which have been initially designed and manufactured without such cleaning and backwash processes in mind. Further it is desirable to simplify the manifolding and piping required to provide gas and liquid to the membrane modules during the filtration, backwashing and cleaning processes.

DISCLOSURE OF THE INVENTION

The present invention seeks to overcome one or more of the abovementioned problems of the prior art, provide one or more of the advantages outlined above or at least provide a useful alternative.

According to one aspect, the present invention provides an aeration/backwash device for use with a porous membrane filtration module including one or more membranes extending longitudinally between vertically spaced upper and lower headers into which the ends of the membranes are potted, the membranes having a permeable wall which, in use, is subjected to a filtration operation wherein feed containing contaminant matter is applied to one side of the membrane wall and filtrate is withdrawn from the other side of the membrane wall, the aeration/backwash device adapted to at least partially surround a portion of said membrane module and including a communication chamber having spaced through-openings in fluid communication with said chamber and the membrane module, wherein, in use, gas is supplied to the chamber and communicated to the membrane module through said through-openings to aerate the membranes within the membrane module and liquid backwash is withdrawn from and/or fed into the membrane module through said through-openings into said chamber.

In one form, gas and liquid backwash may be selectively communicated through the same through-openings.

For preference, the through-openings are vertically spaced through-openings in fluid communication with said chamber and the membrane module, wherein, in use, gas is supplied to the chamber and communicated to the membrane module through at least the upper of said through-openings to aerate the membranes within the membrane module and liquid backwash is withdrawn from the membrane module through the lower of said through-openings into said chamber. It will be appreciated that liquid backwash may be withdrawn through both the upper and lower through-openings.

For preference, backwash or feed liquid may be fed or injected into the base of the module through the lower openings or both set of openings. These liquids may also be used to sweep solids along the membranes to carry out solids backwashed off the membrane surfaces during the gas scour. The backwash waste containing the solids can be flushed from the tank/cell by overflowing at the top of the tank/cell or by draining or pumping from the tank/cell through the through-openings.

Preferably, the vertically spaced through-openings include an upper and lower set of through-openings. For preference, the upper openings are smaller in cross-sectional area than the lower openings. Preferably, the openings of each set of through-openings are axially spaced around the periphery of the chamber. In one form, the liquid backwash may be withdrawn from and/or fed through both sets of openings.

According to another aspect, the present invention provides a porous membrane filtration module including one or more membranes extending longitudinally between vertically spaced upper and lower headers into which the ends of the membranes are potted, the membranes having a permeable wall which, in use, is subjected to a filtration operation wherein feed containing contaminant matter is applied to one side of the membrane wall and filtrate is withdrawn from the other side of the membrane wall, the upper and lower headers being in fluid communication with one or both of the ends of said membranes and at least one associated upper and/or lower filtrate collection chamber such that, in use, filtrate withdrawn from said other side of the membrane wall is communicated through at least one of the upper and/or lower header to the associated upper and/or lower collection chambers, an aeration/backwash device at least partially surrounding a portion of said membrane module and including a communication chamber having spaced through-openings in fluid communication with said communication chamber and the membrane module, wherein, in use, gas is supplied to the communication chamber and communicated to the membrane module through said through-openings to aerate the membranes within the membrane module and liquid backwash is withdrawn from and/or fed into the membrane module through said through-openings into said communication chamber.

For preference, the through-openings are vertically spaced through-openings in fluid communication with said chamber and the membrane module, wherein, in use, gas is supplied to the chamber and communicated to the membrane module through at least the upper of said through-openings to aerate the membranes within the membrane module and liquid backwash is withdrawn from and/or fed into the membrane module through the lower of said through-openings into said chamber.

Preferably, a filtrate connection pipe is provided in fluid communication between the upper and lower filtrate collection chambers and filtrate is withdrawn from one or the other of the collection chambers. For preference, the aeration/backwash device is located adjacent the lower header. Preferably, the upper and lower collection chambers include respective upper and lower collection cups adapted to detachably receive and engage in a fluid-tight manner said upper and lower headers. For preference, the headers are lockably engaged with the collection cups by means of a bayonet-type fitting.

According to yet another aspect the present invention provides a method of removing contaminant material from a feed liquid using a porous membrane filtration module according to the invention including the steps of
  (a) performing a filtration operation wherein feed containing contaminant matter is applied to one side of the membrane wall and filtrate is withdrawn from the other side of the membrane wall,
  (b) communicating said withdrawn filtrate through at least one of the upper and/or lower headers to at least one of the upper and/or lower collection chambers,
  (c) supplying gas to the communication chamber and communicating said gas to the membrane module through said through-openings to aerate the membranes within the membrane module;
  (d) backwashing said membrane wall using a liquid;
  (e) withdrawing liquid backwash from the membrane module through said through-openings into said communication chamber.

Embodiments of the invention allow operation of a module in an inverted format, but also allow for gas and liquid scrubbing and sweep by the use of manifold arrangement installed near the base of the modules. The invention is described in relation to use with individual modules or arrays of modules in open feed tanks, however, it will be appreciated the invention can be equally be adapted to pressurised systems with the use of suitable pressure housings and connections. Desirably, the invention may be used with modules arranged to collect filtrate from both ends, but can equally be applied to modules with filtration from one end only. Filtrate can be withdrawn from the top or the bottom of the module.

In one embodiment, gas is supplied to an annulus surrounding the base of the module. The inside of the annulus contains through-openings that allow the gas to pass through and enter into the membranes. This embodiment also allows for additional openings positioned below the gas openings such that feed liquid may be fed into the base of the module and used to sweep solids along the membranes to carry out solids backwashed off the membrane surfaces during the gas scour. The backwash waste containing the solids can be flushed from the module by overflowing at the top of the tank/cell or by draining or pumping from the tank/cell and/or draining or pumping from the module through the openings.

The modules typically have a closed screen section in the middle that acts to contain the gas and backwash liquid so that it is more efficiently utilised. The open areas allow gas and/or backwash waste to escape from the top and feed water or gas/backwash liquid to enter the module near the base.

The gas and backwash manifolds may be combined into one unit (as described above) or kept as separate manifolds.

Alternatively one set of openings only could be used with the openings being suitably shaped and sized, and spaced around the module such that gas only could be used first, then gas combined with liquid sweep for two phase scrubbing, following by liquid only sweeping. Suitable shapes include slots, triangular and tear drop shapes. Different combinations of these steps, with or without permeate back flush, may also be used.

In one embodiment, a solid section is provided in the screen which extends to just above the gas/backwash inlet openings at the bottom, and up to a short distance from the top of the module (typically, about 100 mm). Alternatively, the screen can be solid along its full length but be provided with apertures adjacent the gas/backwash inlet openings and at the top of the module to allow flow of liquid and gas through the screen. During filtration, the module is submerged and feed liquid can enter the module through the open area at the top of the solid section and flow along the membranes. During backwash, aeration is carried out using the manifold arrangements and processes described above. The key advantage of this configuration is that when the backwash sweep occurs the backwash liquid sweeps along the membranes within the region surrounded by the solid section of the screen only, flowing out the top of the module and overflows from the tank or is drained away to waste. This process reduces the amount of backwash liquid required to accomplish the sweep compared to modules with a large open mesh screen (or no screen) as there is no sweep flow outside the solid section of the screen, so that all the flow that is supplied to the module is used for sweeping. If necessary, any minor back mixing that might occur during overflow may be minimised by adding openings to the solid section near the base just above the aeration/backwash chamber such that a small and controlled amount of bypass occurs. The majority of flow would be directed through the module and the small bypass flow would gently flush any remaining solids or back mixed waste from the space between the modules so as to maintain essentially plug flow.

Alternatively, rather than perform the sweep step from bottom to top in the above arrangement, it is also possible to perform the sweep step from the top to the bottom utilising the backwash/gas line or some other waste connection at the base to carry the backwash waste away. In this case, the backwash may be caused to flow by gravity along the module by filling the feed tank to a predetermined height or maintaining the tank level above the module by the feed supply to the tank. In this case the volume of backwash waste will be similar to the situation above where the backwash feed liquid is supplied from the bottom with the significant advantage that no additional pump is required other than the existing pumps that supply feed to the tank or vessel.

Having the solid section of the screen or a shroud as part of the module also reduces the cost of constructing the device as it performs the multiple functions of protecting the fibres, providing the module support, and creating a vessel to contain liquid and gas during the backwash process. An external shell may also be used to provide the same function.

BRIEF DESCRIPTION OF DRAWINGS

A preferred embodiment of the invention will now be described, by way of example only, with reference to the accompanying drawings in which:

FIG. 2a shows side elevation view of the membrane module of one embodiment of the invention;

FIG. 2b shows a sectional side elevation taken along A-A of FIG. 2a;

FIG. 2c shows an enlarged view of area C of FIG. 2b;

FIG. 2d shows an enlarged view of area B of FIG. 2b;

FIG. 3 shows an exploded part-sectional perspective view of the module of FIG. 2a;

DESCRIPTION OF PREFERRED EMBODIMENTS

Figure 1:
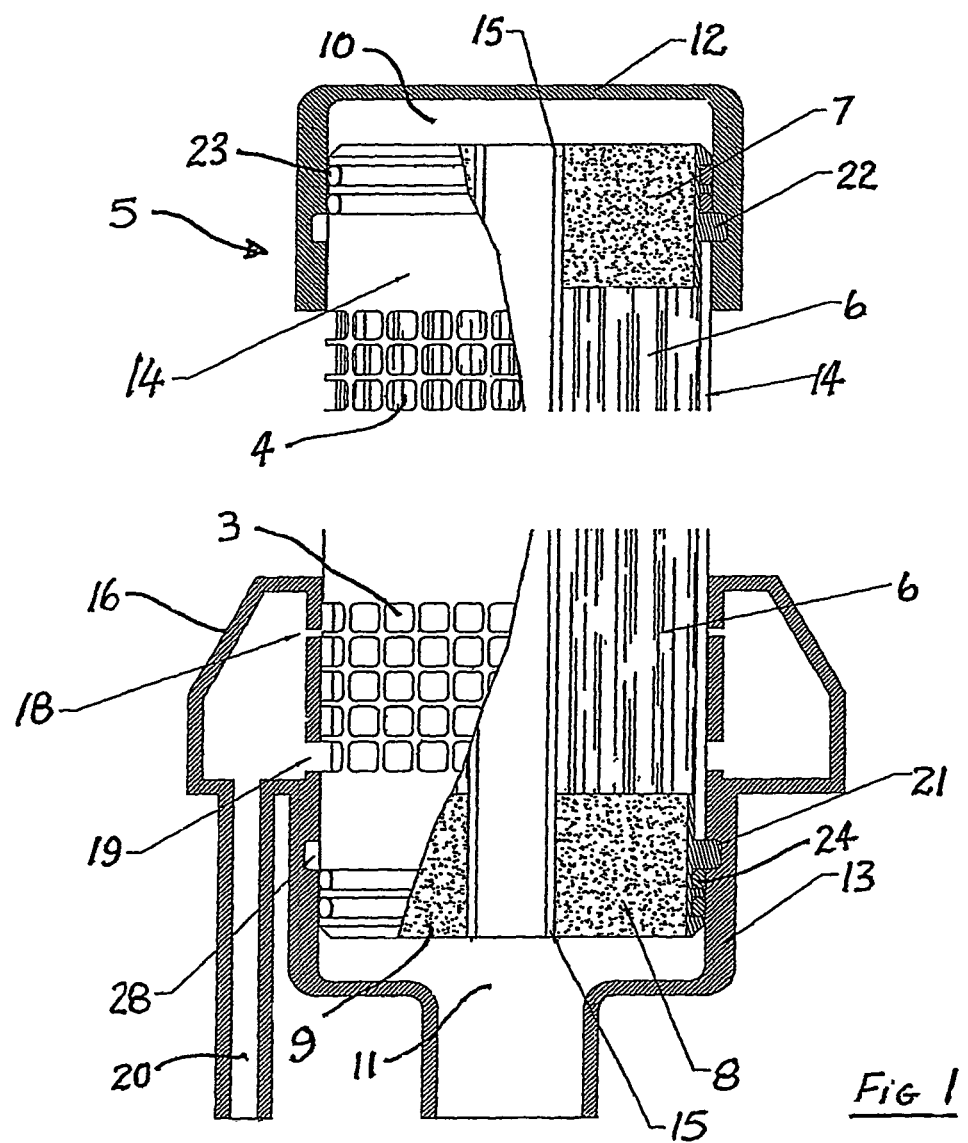
FIG. 1 shows a cross-sectional foreshortened schematic of a typical fibre membrane module having a backwash device according one embodiment of the invention.

Referring to FIG. 1, the membrane module 5 comprises a plurality of porous hollow fibre membranes 6 formed into a bundle and extending between vertically spaced upper and lower headers 7 and 8 into which the ends of the fibre membranes 6 are potted. The upper and lower headers 7 and 8 are in fluid communication with the ends 9 of the fibre membranes 6 and associated upper and lower filtrate collection chambers 10 and 11 formed by upper filtration cap 12 and lower filtration collection cup 13. The fibre membranes are supported between the upper and lower headers by a fluid impermeable screen 14 having apertures 3 and 4 just above the lower header 8 to just below the upper header 7, respectively. The apertures 3 and 4 at either end of the screen 14 are provided to allow for passage of gas and liquid to and from the module membranes 6. A filtrate pipe 15 extends through the centre of the membrane bundle and connects the upper and lower filtrate collection chambers 10 and 11.

Figure 2:
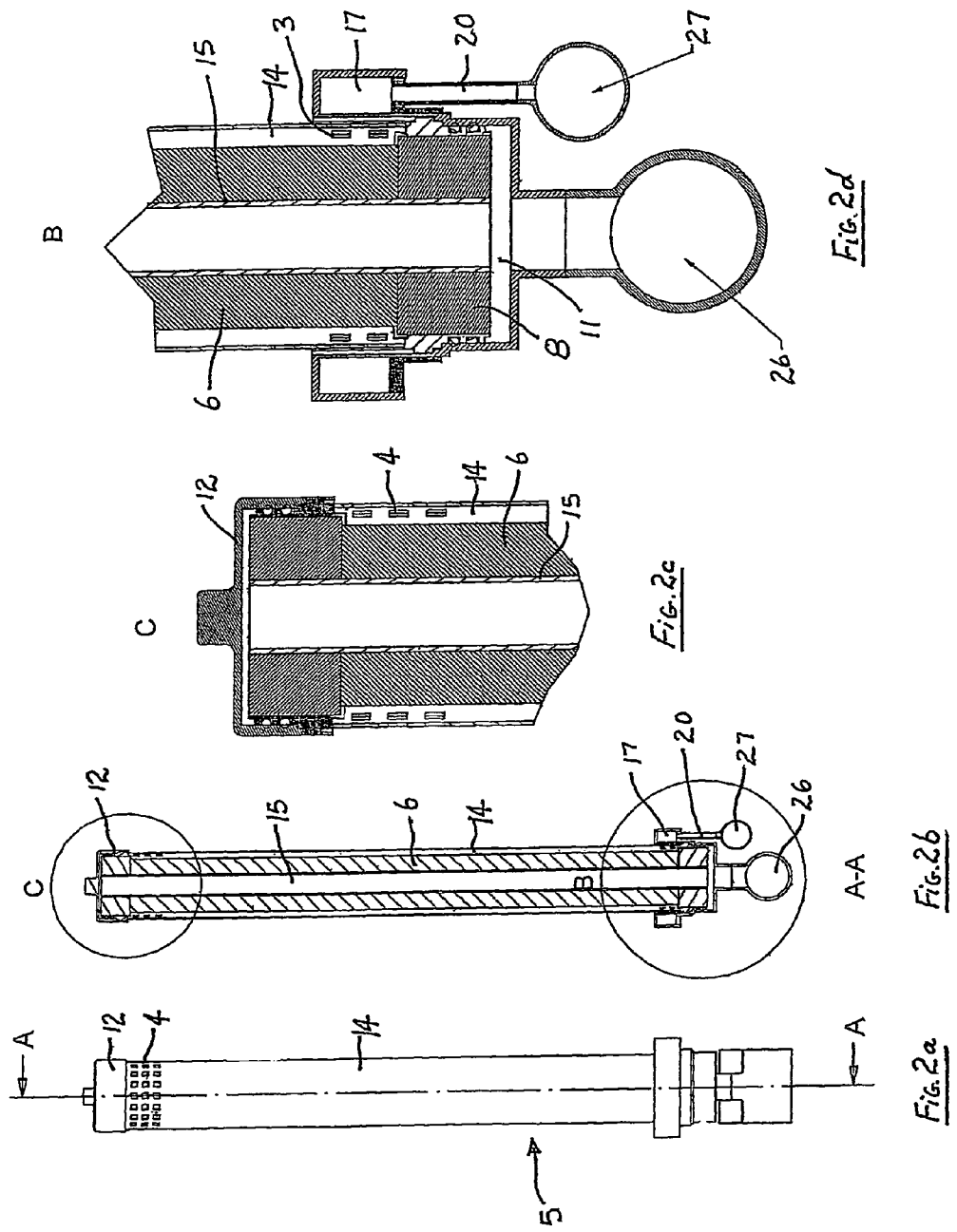
Figure 3:
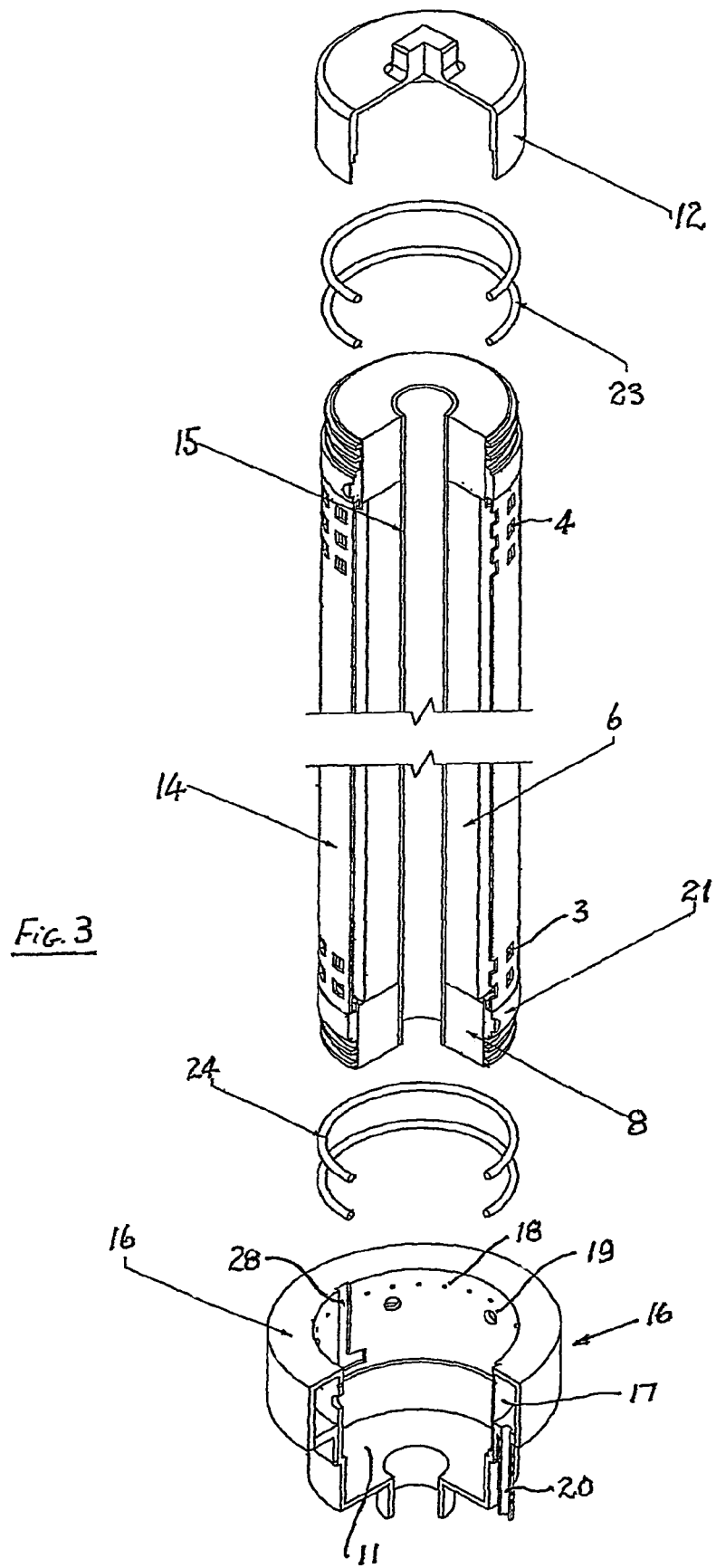

An aeration/backwash device 16 as shown in FIGS. 1 to 3 surrounds a portion of the membrane module 5 above the lower header 8 and adjacent apertures 3 in the screen section 14. The aeration/backwash device includes a communication chamber 17 having vertically spaced upper and lower through-openings 18 and 19 in fluid communication with the communication chamber 17 and the membrane module 5. The communication chamber 17 is selectively connected via a pipe 20 to a source of gas or backwash liquid.

The upper and lower headers 7 and 8 include respective upper and lower potting sleeves 22 and 21 which sealingly engage by means of O-rings 23 and 24 with the upper cap 12 and the lower cup 13, respectively. The lower header 8 may be connected to the aeration/backwash device by any suitable detachable connection, in this case, a bayonet type connection 28 is used.

Figure 4:
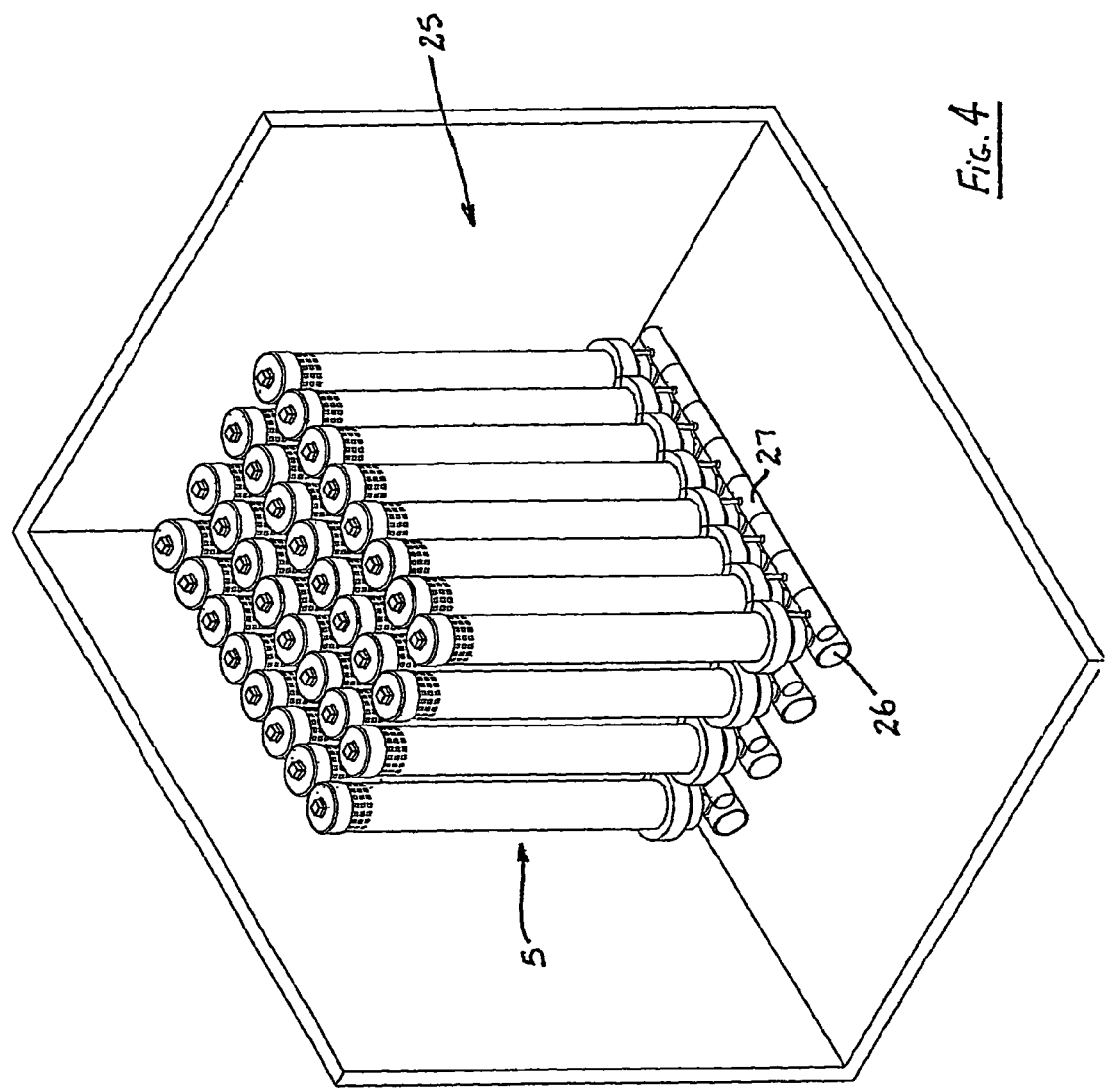
FIG. 4 shows an upper perspective view of a module bank mounted located in a feed tank or vessel.

During operation, the modules 5 are submerged in a feed tank 25, suction is applied to the lower collection chamber 11 which in turn applies suction to the upper (via the filtrate pipe 15) and lower ends of the fibre membranes 6. Filtrate is collected in the filtrate cap 12 and cup 13 and piped away through manifold 26 (see FIG. 2). The upper filtrate cap 12 and lower filtrate cup 13 of the module 5 are connected by the centre filtrate pipe 15 that collects filtrate from the upper filtrate cap 12 of the module and conveys it to the lower filtrate cup 13. This connection between the upper and lower filtrate headers 7 and 8 may also be made by a connection outside the module 5, although in this embodiment it is shown here as being part of the module 5 itself. Filtrate may be collected from either end, but collecting from the bottom simplifies the manifolding. The filtrate collected is piped away through manifold 26 as shown in FIGS. 2 and 4.

Cleaning of the fibre membranes 6 is achieved during backwash by introducing gas, typically air, into the membrane module 5 through the upper of said through-openings 18 which act as aeration openings. These through-openings 18 are sized and spaced apart from the lower backwash through-openings 19 such that the majority of the gas passes through these openings 18 and maintains a liquid seal with the backwash openings 19, although a small amount of leakage through the backwash openings 19 is tolerable. This ensures that the gas is distributed as evenly as possible around the module circumference. Once the gas scour using gas bubbles generated by gas fed into the module membranes 6 is complete (optionally combined with permeate back flush of the membranes), a liquid sweep is introduced via the backwash 19 and aeration openings 18. Any gas still in the chamber 17 is displaced though the aeration openings 18 initially and thus may be utilised in further gas scrubbing of the membranes 6. The chamber 17 then fills with feed liquid and flow occurs into the module 5 through both the aeration openings 18 and the backwash openings 19. The additional backwash openings 19 are provided to allow for a greater resistance of the liquid flow compared to that of the gas.

The liquid flow introduced into the base of the module 5 flows along the module 5 sweeping the solids from the module 5. The backwash waste can be overflowed at the top of the vessel 25, drained away through outlets on the tank or vessel 25, or drained or pumped out of the openings 18, 19.

Additionally, the existing manifolding or an expanded manifold may be used such that as the liquid is introduced into the aeration/backwash device and chamber 17 it flushes gas from the chamber 17 carrying this into the module 5 thereby providing additional gas scrubbing of the membranes 6.

Gas may also be introduced into the chamber 17 or backwash line 20 at the same time as a back flush with feed is occurring. This allows for two phase scrubbing during the sweep stage, with the gas either separating in the chamber 17 or flowing through the aeration openings 18, or being carried with the backwash flow into the module 5 through any of the openings 18, 19.

Alternatively, one set of through-openings 18,19 only may be used with the through-openings suitably shaped and sized, and spaced around the module 5 such that gas only is used first, then gas combined with liquid for two phase scrubbing and sweep, followed by liquid only sweeping. Different combinations of these steps, with or without permeate back flush, may also be used.

FIG. 4 shows how the modules 5 may be installed from above the tank 25 into filtrate and aeration/backwash manifolds 26 and 27 arranged along the bottom of the feed tank/vessel 25. The aeration/backwash manifolds 27 are connected to pipe 20 the aeration/backwash device 16.

Figure 5:
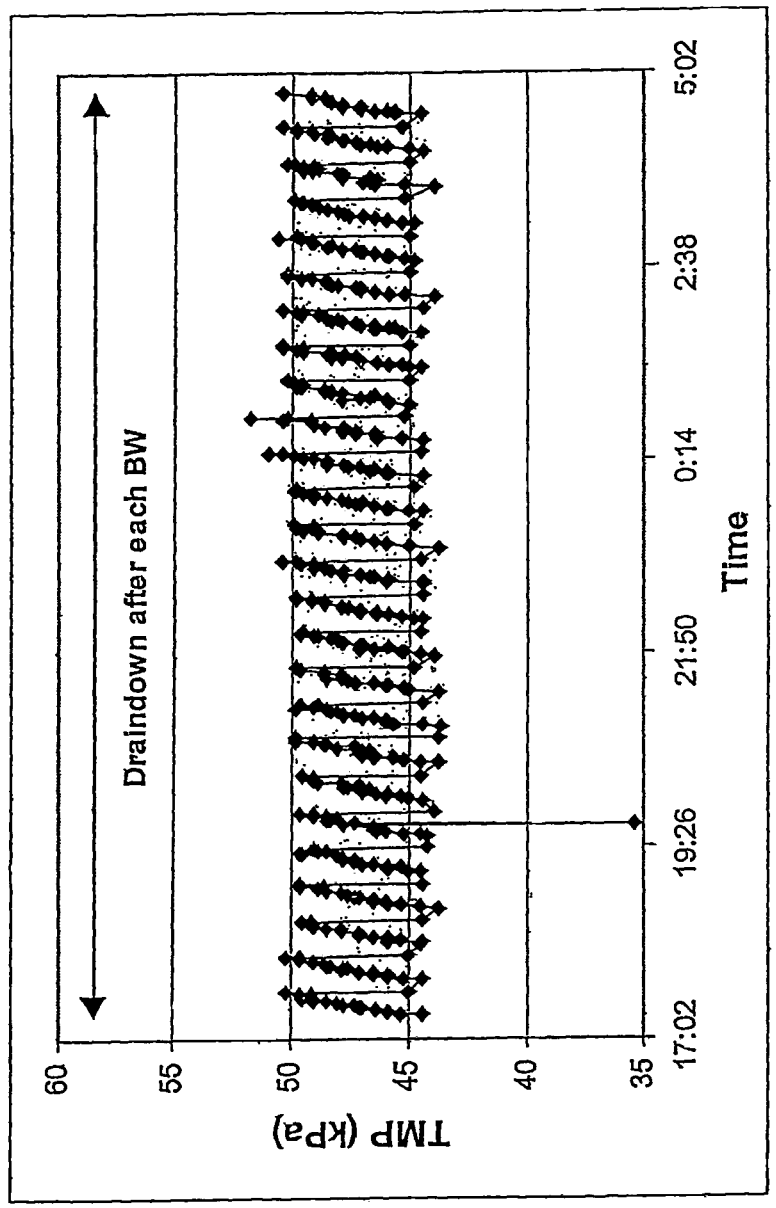
FIG. 5 shows a graph of transmembrane pressure (TMP) of a test module according to an embodiment of the invention over time.

FIG. 5 shows a graph of transmembrane pressure (TMP) of a module according to the invention over time with drain down of the module contents after each backwash. This graph shows that the TMP of the module according to the invention recovers effectively after each drain down.

It will be appreciated that further embodiments and exemplifications of the invention are possible without departing from the spirit or scope of the invention described.

The invention claimed is:

1. An aeration/backwash device configured for use with a membrane filtration module comprising one or more membranes and opposing potted ends, comprising:
a communication chamber including a closed internal volume defined by an inner wall, an outer wall, an upper wall coupling the inner wall to the outer wall, and a lower wall coupling the inner wall to the outer wall, the communication chamber at least partially surrounding a circumference of the membrane filtration module, the inner wall having upper through-openings and lower through-openings vertically spaced apart from the upper through-openings, the upper and lower through-openings spaced circumferentially about the inner wall, each through-opening having a longitudinal axis substantially perpendicular to the one or more membranes;

a source of gas in fluid communication with the internal volume of the communication chamber; and a source of backwash liquid in fluid communication with the internal volume of the communication chamber, wherein the source of gas and the source of backwash liquid share a common inlet to the internal volume of the communication chamber.

2. The aeration/backwash device according to claim 1, wherein the upper and lower through-openings are configured to allow selective fluid communication of the gas and backwash liquid between the communication chamber and the membrane filtration module through the same upper or lower through-openings.

3. The aeration/backwash device according to claim 1, wherein the upper and lower through-openings are configured to allow the gas to fluidly communicate through at least the upper through-openings into the membrane filtration module and to allow the backwash liquid to fluidly communicate through the lower through-openings.

4. The aeration/backwash device according to claim 3, wherein the upper and lower through-openings are configured to allow the backwash liquid or a source of feed liquid in fluid communication with the communication chamber to fluidly communicate from the communication chamber to the membrane filtration module through the lower through-openings or through the upper and lower through-openings.

5. The aeration/backwash device according to claim 4, wherein the upper and lower through-openings are configured to allow the backwash or feed liquid to fluidly communicate from the membrane filtration module to the communication chamber through the lower through-openings or through the upper and lower through-openings.

6. The aeration/backwash device according to claim 1, wherein the upper through-openings are smaller than the lower through-openings.

7. The aeration/backwash device according to claim 1, wherein the upper and lower through-openings are axially spaced around the periphery of the chamber.

8. The aeration/backwash device according to claim 1, wherein both the upper and lower through-openings are configured to allow the backwash liquid to fluidly communicate from the membrane filtration module to the communication chamber or from the communication chamber to the membrane filtration module through the upper and lower through-openings.

9. The aeration/backwash device according to claim 1, wherein the device is formed as an annulus.

10. A porous membrane filtration module comprising:
an upper and lower header vertically spaced from each other;
one or more membranes having a permeable wall and an upper and lower end extending longitudinally between the upper and lower headers, into which the ends of the one or more membranes are potted, wherein at least one of the upper or lower ends of the membranes is in fluid communication with the upper or lower header, and the permeable wall is configured to allow feed containing contaminant matter to be applied to one side of the wall and to allow filtrate to be withdrawn from the other side of the wall;

at least one filtrate collection chamber in fluid communication with at least one of the upper and lower header; and an aeration/backwash device comprising:
a communication chamber including a closed internal volume defined by an inner wall, an outer wall, an upper wall coupling the inner wall to the outer wall, and a lower wall coupling the inner wall to the outer wall, the communication chamber at least partially surrounding a circumference of the membrane filtration module, the inner wall having upper through-openings and lower through-openings vertically spaced apart from the upper through-openings, the upper and lower through-openings spaced circumferentially about the inner wall, each through-opening having a longitudinal axis substantially perpendicular to the one or more membranes;

a source of gas in fluid communication with the internal volume of the communication chamber; and a source of backwash liquid in fluid communication with the internal volume of the communication chamber, wherein the source of gas and the source of backwash liquid share a common inlet to the internal volume of the communication chamber.

11. The porous membrane filtration module according to claim 10, wherein the upper and lower through-openings are configured to allow the gas to fluidly communicate through at least the upper through-openings into the membrane filtration module and to allow the backwash liquid to fluidly communicate through the lower through-openings.

12. The porous membrane filtration module according to claim 10, further comprising a filtrate connection pipe in fluid communication with and configured to withdraw filtrate from the at least one filtrate collection chamber.

13. The porous membrane filtration module according to claim 10, wherein the aeration/backwash device is located adjacent the lower header.

14. The porous membrane filtration module according to claim 10, wherein the at least one filtrate collection chamber further comprises at least one collection cup adapted to detachably receive and engage in a fluid-tight manner with the upper or lower header.

15. The porous membrane filtration module according to claim 14, wherein the upper or lower header is engaged with the at least one collection cup by means of a bayonet-type fitting.

16. The porous membrane filtration module according to claim 10, further comprising a screen that at least partially surrounds the one or more membranes.

17. The porous membrane filtration module according to claim 16, wherein the screen is a sleeve which extends along part of the length of the one or more membranes.

18. The porous membrane filtration module according to claim 16, wherein the screen is solid.

19. The porous membrane filtration module according to claim 18, wherein the screen extends along the full length of the membrane filtration module and comprises one or more openings adjacent the upper and lower through-openings of the aeration/backwash device to allow communication with the membranes and one or more additional openings at or adjacent a top of the module and configured to allow flow of a gas or a liquid therethrough.

20. The porous membrane filtration module according to claim 19, having one or more further openings in the screen at or adjacent to the aeration/backwash device and configured to allow bypass of a backwash flow.

21. The porous membrane filtration module according to claim 16, wherein the screen is located above the aeration/backwash device.

22. A membrane filtration system comprising:
  at least one membrane filtration module comprising one or more membranes and opposing potted ends;
  a feed tank in fluid communication with the at least one membrane filtration module;
  at least one filtrate manifold in fluid communication with the at least one membrane filtration module and a source of filtrate;
  at least one aeration/backwash device comprising:
    a communication chamber including a closed internal volume defined by an inner wall, an outer wall, an upper wall coupling the inner wall to the outer wall, and a lower wall coupling the inner wall to the outer wall, the communication chamber at least partially surrounding a circumference of the membrane filtration module, the inner wall having upper through-openings and lower through-openings vertically spaced apart from the upper through-openings, the upper and lower through-openings spaced circumferentially about the inner wall, each through-opening having a longitudinal axis substantially perpendicular to the one or more membranes; and
    a source of gas in fluid communication with the internal volume of the communication chamber;
  at least one aeration/backwash manifold in fluid communication with the aeration/backwash device; and
  a source of backwash liquid in fluid communication with the aeration/backwash manifold, wherein the source of gas and the source of backwash liquid share a common inlet to the internal volume of the communication chamber.

23. The membrane filtration system according to claim 22, wherein the source of gas is in fluid communication with the at least one aeration/backwash manifold.

24. The membrane filtration system according to claim 22, further comprising at least one gas manifold in fluid communication with the at least one aeration/backwash device.

25. The membrane filtration system according to claim 24, wherein the source of gas is in fluid communication with the at least one gas manifold.

26. The membrane filtration system according to claim 22, wherein the at least one filtrate and aeration/backwash manifolds are arranged along a bottom of the feed tank.

27. The membrane filtration system according to claim 22, wherein the at least one filtrate and aeration/backwash manifolds are installed near a base of the at least one membrane filtration module.

28. The membrane filtration system according to claim 22, wherein the at least one aeration/backwash device is formed as an annulus that surrounds a base of the at least one filtration module.

29. The membrane filtration system according to claim 22, wherein the upper and lower through-openings are configured to allow the gas to fluidly communicate through at least the upper through-openings into the membrane filtration module and to allow the backwash liquid to fluidly communicate through the lower through-openings.

30. The membrane filtration system according to claim 29, wherein the lower through-openings are in fluid communication with a source of feed liquid.

31. The membrane filtration system according to claim 29, wherein the upper and lower through-openings are axially spaced around the periphery of the communication chamber.

32. The membrane filtration system according to claim 22, wherein the source of filtrate is fluidly communicated to the at least one filtrate manifold from a top or a bottom of the at least one membrane filtration module.

33. The membrane filtration system according to claim 22, wherein both the upper and lower through-openings are configured to allow the backwash liquid to fluidly communicate from the membrane filtration module to the communication chamber or from the communication chamber to the membrane filtration module through the upper and lower through-openings.

* * * * *